I

United States Patent
Sun et al.

(10) Patent No.: US 11,314,242 B2
(45) Date of Patent: Apr. 26, 2022

(54) METHODS AND SYSTEMS FOR FAULT DETECTION AND IDENTIFICATION

(71) Applicant: ExxonMobil Research and Engineering Company, Annandale, NJ (US)

(72) Inventors: Weike Sun, Cambridge, MA (US); Antonio R. Paiva, Clinton, NJ (US); Peng Xu, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/743,301

(22) Filed: Jan. 15, 2020

(65) Prior Publication Data
US 2020/0241514 A1  Jul. 30, 2020

Related U.S. Application Data

(60) Provisional application No. 62/797,568, filed on Jan. 28, 2019.

(51) Int. Cl.
*G05B 23/02* (2006.01)

(52) U.S. Cl.
CPC .................................. *G05B 23/024* (2013.01)

(58) Field of Classification Search
CPC ....... G05B 23/024; G06N 3/0445; G06N 3/10
See application file for complete search history.

(56) References Cited

U.S. PATENT DOCUMENTS

| 6,415,276 | B1 * | 7/2002 | Heger ...................... G05B 9/02 702/183 |
| 2007/0162241 | A1 * | 7/2007 | Yuan ................... G05B 19/4065 702/81 |
| 2007/0255442 | A1 * | 11/2007 | Nakamura ........... G05B 23/024 700/108 |
| 2014/0222394 | A1 * | 8/2014 | Drees ...................... G06F 30/20 703/2 |

(Continued)

FOREIGN PATENT DOCUMENTS

| WO | 2007130692 A2 | 11/2007 |
| WO | 2015099964 A1 | 7/2015 |

OTHER PUBLICATIONS

Park, et al.; "LiReD: A Light-Weight Real-Time Fault Detection System For Edge Computing Using LSTM Recurrent Neural Networks"; Sensors; 2018; vol. 18 No. 2110; pp. 1-15.

(Continued)

*Primary Examiner* — Mischita L Henson
(74) *Attorney, Agent, or Firm* — Vorys, Sater, Seymour and Pease LLP

(57) ABSTRACT

An example method can comprise creating a non-linear neural network based model of a system based on historical operational data of the system and receiving first sensor data from a plurality of sensors associated with the system. Predicted next sensor data can be determined based on the received first sensor data and the non-linear network model. Second sensor data can be received from the plurality of sensors, and a measure of deviation between the predicted next sensor data and the received second sensor data is calculated. In response to the measured deviation exceeding a predefined threshold; it can be determined that a fault has occurred.

16 Claims, 4 Drawing Sheets

(56) References Cited

U.S. PATENT DOCUMENTS

2019/0384255 A1* 12/2019 Krishnaswamy .. G05B 19/4063

OTHER PUBLICATIONS

Fortunato, et al.; "Bayesian Recurrent Neural Networks"; Retrieved from the Internet: URL:https://arXiv.org/pdf/1704.02798v3; Mar. 21, 2018; pp. 1-14.

Yang, et al.; "Rotating Machinery Fault Diagnosis Using Long-Short-Term Memory Recurrent Neural Network" International Federation of Automatic Control (IFAC) Hosting by Elsevier Ltd.; 2018; p. 228-232.

Sun, et al.; "Fault Detection and Identification Using Bayesian Recurrent Neural Networks"; Retrieved Online Library Cornell University: arXiv:1911.04386v1; Nov. 11, 2019; pp. 1-42.

The International Search Report and Written Opinion dated Apr. 14, 2020.

Downs et al., "A Plant-Wide Industrial Process Control Problem", Computers and Chemical Engineering, 1993, vol. 17, pp. 245-255.

Gal et al., "A Theoretically Grounded Application of Dropout in Recurrent Neural Networks", University of Cambridge, 2016, pp. 1-9.

Gal et al., "Dropout as a Bayesian Approximation: Representing Model Uncertainty in Deep Learning", University of Cambridge, 2016, vol. 48, pp. 1-12.

Nouwen et al., "Classification of Environmentally Occurring Chemicals Using Structural Fragments and PLS Discriminant Analysis", Environmental Science & Technology, 1997, vol. 31, pp. 2313-2318.

Wu et al., "Deep Convolutional Neural Network Model Based Chemical Process Fault Diagnosis", Computers and Chemical Engineering, 2018, vol. 115, pp. 185-197.

Chiang, L.H., Russell, E.L., Braatz, R.D., 2001. Fault Detection and Diagnosis in Industrial Systems, Advanced Textbooks in Control and Signal Processing. Springer London, London. doi:10.1007/978-1-4471-0347-9.

* cited by examiner

METHODS AND SYSTEMS FOR FAULT DETECTION AND IDENTIFICATION

CROSS REFERENCE TO RELATED APPLICATIONS

This application claims priority to U.S. Provisional Application Ser. No. 62/797,568 filed Jan. 28, 2019, which is herein incorporated by reference in its entirety.

BACKGROUND

In industrial manufacturing processes, a fault is defined as any abnormal deviation from normal operating conditions. A small fault in a complex industrial system can initiate a to series of events that can result in loss of efficiency, reduction in reliability, or creation of safety hazards, among other possible outcomes. As a result, there is a growing need for techniques that assure a satisfactory level of process reliability. Such techniques include detection and/or identification of faults.

Fault detection comprises determining whether a fault has occurred within a system. Fault identification comprises determining the variables, or other elements of the system, most relevant to diagnose the fault. Effective fault detection and identification are important tools to assist operators and engineers in monitoring system processes to help achieve maximum efficiency.

Various fault detection and identification methods have been proposed in previous systems, and can be classified into three categories: data-driven, analytical and knowledge-based. However, for large-scale modern industrial systems and processes, it is difficult to apply analytical and knowledge-based methods due to the system complexity. Instead, data-driven methods for fault detection and identification have been both researched and used for the past decade and have been effective in practice.

Statistical multivariate data-driven methods, such as principal component analysis (PCA) and partial least squares (PLS), can perform acceptably for fault detection under certain conditions. These multivariate techniques take into account correlations between different variables and can be very effective in fault detection when the sensor measurements are highly correlated, which is usually the case. However, PCA and PLS methods assume that the measurements at different times are statistically independent and identically distributed. This assumption is acceptable when the sampling time of the process is relatively long, but performance of PCA and PLS degrades with fast sampling because important temporal correlations are not modeled. To handle multivariate processes with temporal dynamics, dynamic principal component analysis (DPCA) and dynamic partial least squares (DPLS) have been developed, which augment each observation vector with previous observations of certain time lags. Still, these are linear methods, and thus are limited in the dependencies and dynamics of the processes that they can model.

Accordingly, there is a need for fault detection and identification methods for use with complex industrial systems that both model temporal correlations between variables and are capable of modeling non-linear dependencies. Thus, a number of methods with nonlinear models, including neural network models, have been demonstrated in the literature. Some of those methods are capable of modeling nonlinear correlations between variables and dependencies in time. Those models are then used to assess whether the process' dynamics are deviating from the normal operating range via an appropriate measure or statistic. Since the metric is constant throughout, the level of variability in the operating conditions and the fidelity of the model are assumed to be constant however, which is seldom the case. If the system has strong nonlinearities in the temporal dynamics this can lead to multimodal distributions in the model responses, which further decreases the robustness of these metrics. These issues can result in additional false alarms under normal conditions and failure to detect certain faults. Finally, the measures or statistics calculated by the methods do not directly assist in fault identification, requiring significant analysis for troubleshooting the cause of the fault.

Therefore, there is a need for methods capable of quantifying the uncertainty (i.e., the variability) in the predictions in addition to nonlinear modeling capabilities across variables and time.

SUMMARY

It is to be understood that both the following general description and the following detailed description are exemplary and explanatory only and are not restrictive. Provided are methods and systems for scenario-based analysis of oil and/or gas fields.

In one aspect, an example method can comprise creating a non-linear neural network based model of a system based on historical operational data of the system and receiving first sensor data from a plurality of sensors associated with the system. Predicted next sensor data can be determined based on the received first sensor data and the non-linear network model. Second sensor data can be received from the plurality of sensors, and a measure of deviation between the predicted next sensor data and the received second sensor data is calculated. In response to the measured deviation exceeding a predefined threshold; it can be determined that a fault has occurred.

In another aspect, an apparatus can comprise a plurality of sensors, one or more processors in communication with the plurality of sensors, and a memory. The memory can comprise processor executable instructions that, when executed by the one or more processors, cause the apparatus to create a non-linear neural network based model of a system based on historical operational data of the system. The one or more processors can receive first sensor data from the plurality of sensors and determine predicted next sensor data based on the received first sensor data and the non-linear network model. The one or more processors can then receive second sensor data from the plurality of sensors and calculate a measure of deviation between the predicted next sensor data and the received second sensor data. In response to the measured deviation exceeding a predefined threshold; the apparatus can determine that a fault has occurred.

In yet another aspect, a method can attempt to identify the fault upon detection. This may comprise classifying the fault into specific types, identifying the system sensors that deviate most from normal conditions or that most responsible for the detection, or using the time of deviations at individual sensors to analyze the fault propagation across the system.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
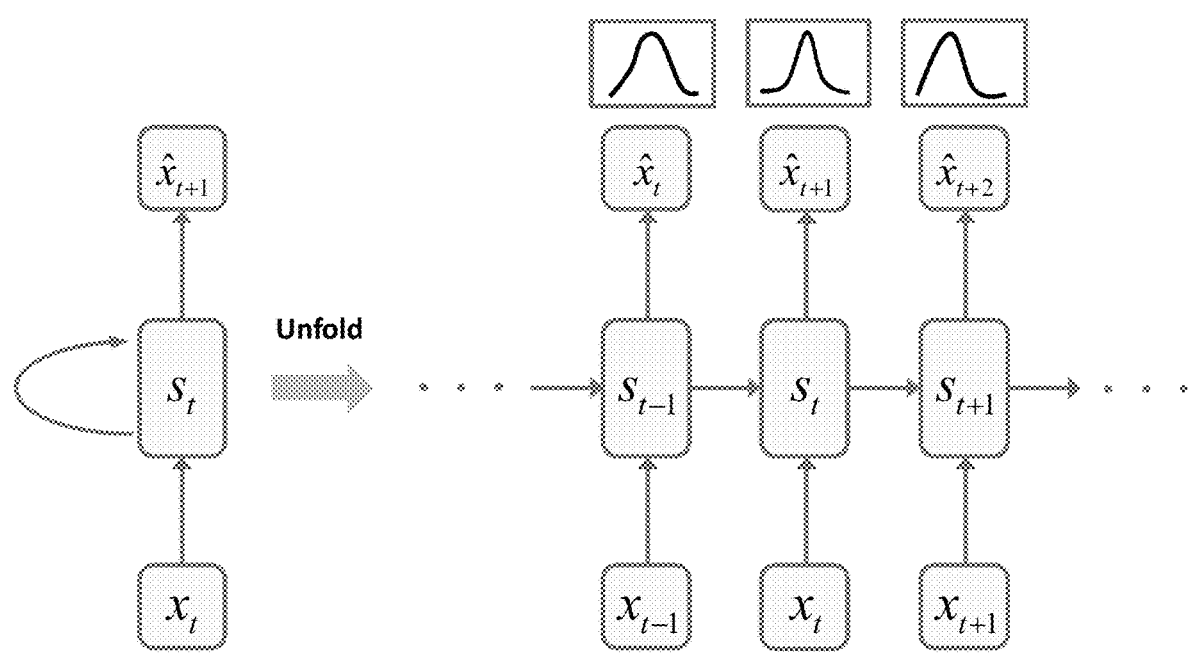
FIG. 1 is an example Bayesian Recurrent Neural Network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for fault detection and identification. The methodology uses the capabilities of probabilistic regression models. The preferred embodiment for fault detection and identification is based on a Bayesian recurrent neural network (BRNN). Other regression models, such as Bayesian convolutional neural networks or Gaussian Processes could also be readily used. Similarly, one could also utilize Bayesian models built from chemical and/or physical understanding or a description of the system. Furthermore, machine learning ensemble methods with appropriate dataset diversity, obtained for instance using bootstrapping sampling, could also be used. Random forests are an example of the latter type of methods, in which an ensemble of classification and regression trees are fitted on bootstrapped datasets.

A Bayesian network is a representation of the probabilistic relationships among distinctions about the world. Each distinction, sometimes called a variable, can take on one of a mutually exclusive and exhaustive set of possible states. A Bayesian network is expressed as an acyclic-directed graph where the variables correspond to nodes and the relationships between the nodes correspond to arcs. Associated with each variable in a Bayesian network is a set of probability distributions.

The arcs in a Bayesian network convey dependence between nodes. When there is an arc between two nodes, the probability distribution of the first node depends upon the value of the second node when the direction of the arc points from the second node to the first node. Missing arcs in a Bayesian network convey conditional independencies. However, two variables indirectly connected through intermediate variables are conditionally dependent given lack of knowledge of the values ("states") of the intermediate variables.

The variables used for each node may be of different types. Specifically, variables may be of two types: discrete or continuous. A discrete variable is a variable that has a finite or countable number of states, whereas a continuous variable is a variable that has an uncountably infinite number of states. An example of a discrete variable is a Boolean variable. Such a variable can assume only one of two states: "true" or "false." An example of a continuous variable is a variable that may assume any real value between −1 and 1. Discrete variables have an associated probability mass function. Continuous variables, however, have an associated probability density function ("density"). Either of these functions can also be referred to more generally as a "distribution" of the random variable.

A recurrent neural network (RNN) is a class of artificial neural network where connections between nodes form a directed graph along a sequence. The structure of the recurrent neural network allows it to exhibit temporal dynamic behavior for a time sequence. That is, recurrent neural networks can use their internal state (memory) to process sequences of inputs.

The term "recurrent neural network" can be used to refer to a number of network architectures with temporal dynamic behavior. All of the architectures include an internal state or memory that modifies the response of the network or units within based on the inputs and internal states from previous times in the sequence.

RNNs have made great inroads in language modeling, speech recognition, image captioning, and music composition, and have achieved state-of-the-art performance on a wide range of sequential data modeling tasks. The key idea behind RNNs is to make use of sequential information in time series data. An architecture known as a simple recurrent neural network can be adopted and is depicted in FIG. 1. The network has an input layer x, a hidden layer s (also called state layer), and an output layer ŷ. At each time t, the input to the network is denoted as $x_t$, output is denoted as $\hat{y}_t$ and the state is denoted as $s_t$. Each of the input, output, and state can be represented as row vectors. In one example, the state and output layers can be computed:

$$s_t = \varphi(x_t W_s + s_{t-1} U_s + b_s)$$

$$\hat{y}_t = s_t W_y + b_y$$

where $W_s$, $U_s$, $W_y$, $b_s$, and $b_y$ are model parameters, and $\varphi$ is an element-wise activation function which can be either a linear or nonlinear function (e.g., the logistic, hyperbolic tangent, or a rectifier linear unit). The mathematical formulations shown can be viewed as a nonlinear version of a state space model, which captures the nonlinear dynamic information in the system. This model is considered more powerful for complex industrial process as compared to traditional statistical models. More complex state representations, comprising more intricate combinations of weighted input, previous state, and bias terms, or using additional internal memory states, can be used without departing from the scope of the invention. Moreover, this representation can be layered a number of times with the state vector resulting from one layer being used as input to the subsequent layer.

BRNNs combine statistical modeling within recurrent neural networks training to compose a probabilistic model. By applying a sampling methodology during training and application of the RNN, the underlying RNN is able to model uncertainty from a Bayesian perspective. As a result, instead of point estimates, BRNNs can perform Bayesian inference, which provides probabilistic distributions over the outputs.

A BRNN is a neural network with a distribution over its weights. Accordingly, the BRNN views the parameters ($W_s$, $W_y$, $U_s$, $b_s$, $b_y$) as random variables following a certain distribution. Given a training dataset, a posterior distribution over the space of parameters can be learned through training. With the updated distributions, the prediction of an output y* can be made. For example, the prediction of the output y* can be made in dependence of a precision parameter, a state and past inputs. Uncertainty in the prediction can be directly reflected in distribution of the possible outputs.

In neural networks, exact posterior inference is rarely tractable. Traditional algorithms for approximating Bayesian inference are generally not applicable to train a RNN with relatively large number of parameters and complex architectures. However, several approximation inference methods can be used, including Monte Carlo (MC) dropout sampling, variational dropout, Bayes by BackProp, multiplicative normalizing flows, and probabilistic backpropagation.

In the example Recurrent Neural Network shown in FIG. 1 with Bayesian distributions over its predictions inference is computationally expensive. Thus, variational inference using a dropout-based variational distribution will be used herein to obtain a characterization of the uncertainty in the model predictions produced by the Bayesian RNN. This will be referred throughout as variational dropout or Monte Carlo (MC) dropout sampling. The variational dropout framework is used to realize the Bayesian RNN due to its simplicity, regularization capability, strong generalization ability, and scalability.

Using dropout as a variational approximation to the posterior of a Bayesian neural network (BNN) can be applied directly to NNs with any architecture. In the context of RNNs, variational dropout has been shown to act as an effective regularization method for reducing overfitting by preventing co-adaptions in RNN, while standard dropout can lead to model instabilities and disrupt an RNN's capability to model a sequence. Moreover, and unlike other approximation methods, variational dropout does not require modifications on the model architecture and training method. As a result, uncertainty estimation incurs only the computation cost due to multiple stochastic forward passes.

Variational dropout works as variational inference for the BNN. Variational inference is a technique to approximate a generally intractable posterior distribution with a simpler parameterized distribution, so that the prediction of the output y* can be approximated by Monte Carlo (MC)

integration with a simpler, parameterized distribution. In particular, the approximation distribution can be factorized over weight matrices.

Implementation of variational dropout is relatively simple and straightforward. During both training and testing procedure, the variational approximation is implemented by applying dropout to inputs, outputs, and hidden states resulting in multiple realizations of the RNN model. Dropout masks used for each model realization can be kept fixed between time steps. Variational dropout applied in the testing procedure can be approximately viewed as MC samplings from the posterior predictive distribution. Given a new observation x*, by repeating N stochastic forward passes, N samples $\{\{\hat{y}*(i)\}_{i=1 \ldots N}$ from approximate predictive posterior are collected, and the empirical estimators for a predictive mean, a standard deviation, and a predictive covariance of the posterior can be approximated. Higher-order statistics can also be estimated by the samples by moment-matching.

Since the forward passes involve a number of independent and fixed realizations of the RNN model distribution, they can be done concurrently, thus making variational dropout a good candidate for online monitoring.

The Bayesian RNN based fault detection and identification framework has several main advantages over traditional methods: the Bayesian RNN can model nonlinear dependencies and temporal dynamics in multivariate processes; the Bayesian RNN can provide a fault detection methodology with a probabilistic interpretation; the Bayesian RNN can yield direct fault identification, without need for post-detection procedures (unlike those based on traditional statistical contribution plots); and the Bayesian RNN can assist fault diagnosis via estimation of a fault propagation path. Further, combining the fault detection and identification results with user judgement and/or a classification method can allow the Bayesian RNN based framework to categorize the faults into, for example, three classes: under control disturbance, back to control disturbance and out of control fault. This categorization can help to reduce false alarms and assist operators in determining an appropriate course of action in response to a detected fault.

A fault detection and identification system can comprise a central monitoring system in signal communication with one or more sensors. The sensors can measure one or more characteristics of an industrial system. For example, sensors can measure temperature, vibration, acidity (e.g., pH) of a liquid, or any of a wide variety of characteristics regarding the industrial system itself and/or the product on which the system is operating. Each of the one or more sensors can provide information to the central monitoring system. The sensors can provide information to the central monitoring system on an intermittent or periodic basis. In some aspects, the sensors can be synchronized, such that each of the sensors measures the one or more characteristics substantially simultaneously.

The central monitoring system can develop and store a model to characterize the normal operating characteristics of a process. Historical data collected from normal operating condition of the process can be used to develop the model. Thereafter, when the central monitoring system receives information from the sensors, the central monitoring system can predict a next information set based on the normal operating characteristics of the process. In some aspects, the prediction can comprise a plurality of predicted subsequent states. For example, the central monitoring system can predict a plurality of predicted subsequent states, paired with a probability of occurrence of each of the plurality of predicted subsequent states.

Upon receiving a next subsequent information set from the sensors, the central monitoring system can compare the received next subsequent information set with the predicted subsequent states. If the received next subsequent information matches one of the plurality of predicted subsequent states, then it can be determined that the process is experiencing normal operating conditions. Alternatively, if the received next subsequent information does not match any of the plurality of predicted subsequent states, then it can be determined that the process experiencing a fault.

Figure 2:
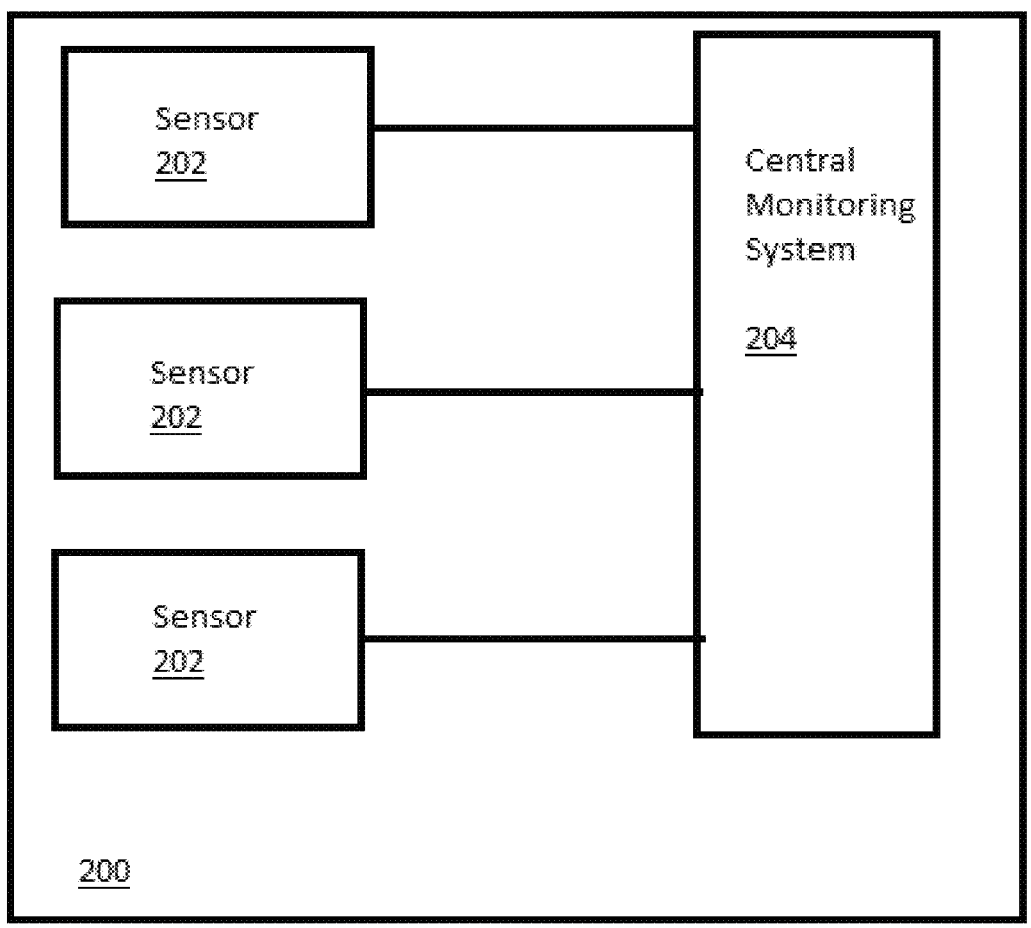
FIG. 2 shows an example fault detection and identification system.

FIG. 2 is a block diagram illustrating various aspects of an exemplary system 200 in which the present method operates. While a functional description is provided, one skilled in the art will appreciate that the respective functions can be performed by software, hardware, or a combination of software and hardware.

In an aspect, the system 200 can comprise one or more sensors 202 and a central monitoring system 204. Each of the one or more sensors 202 can be configured to measure at least one property of its environment. For example, each sensor can be configured to monitor one or more of an ambient temperature, a vibration, an acidity/alkalinity (e.g., pH) of a liquid, or any of a wide variety of characteristics regarding the industrial system itself and/or the product on which the system operates. In some aspects, the one or more sensors 204 can be configured to take a measurement at set intervals. For example, the sensors can be configured to take a measurement every 100 milliseconds, once per second, once per minute, or the like. In other aspects, the sensors can be configured to take a measurement in response to a signal received at the sensor. As an example, each of the one or more sensors 202 can take a measurement in response to a signal received from the central monitoring system 204.

The central monitoring system 204 comprises a communication unit configured to communicate with the one or more sensors 202. The central monitoring system 204 can further comprise one or more processors configured to model the industrial system. For example, the one or more processors can be configured to model the industrial system as a Bayesian Recurrent Neural Network. The processor is configured to receive data from the communication unit.

Figure 3:
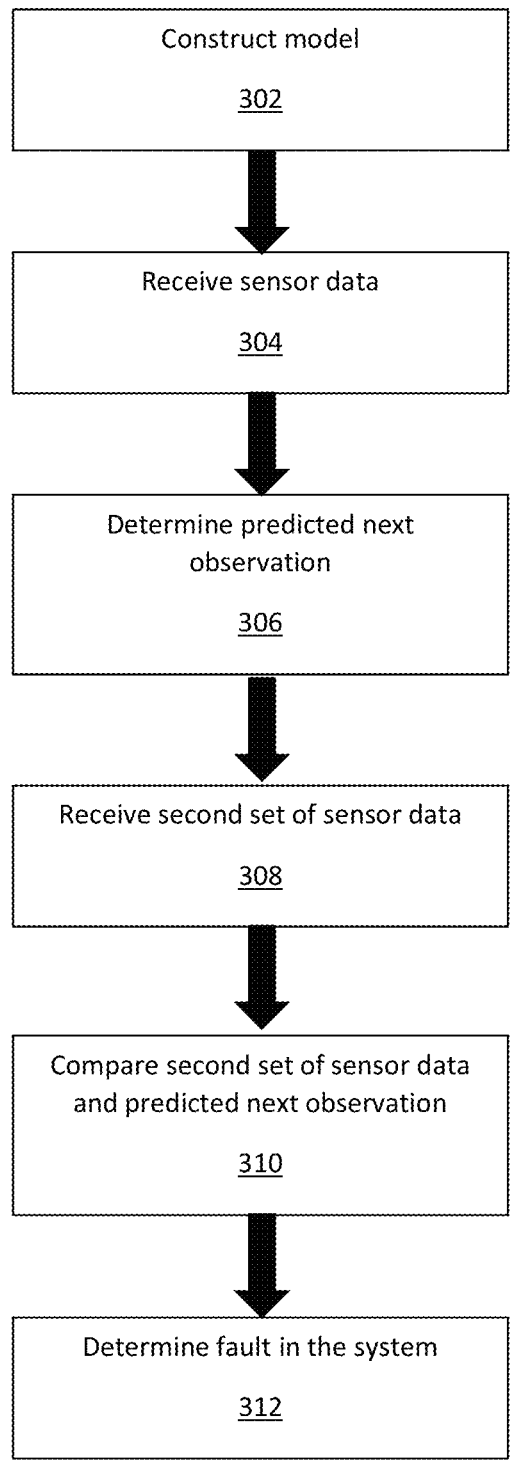
FIG. 3 is a flowchart of an example method.

FIG. 3 is a flow chart showing a process 300 for operating a fault detection and identification system. The process 300 begins with construction of a model for characterizing normal operating characteristics of a process in step 302. Constructing the model can commence with collection of data. The collected data can comprise historical data collected from only normal operation of the industrial system. In some aspects, the collected data can be preprocessed (e.g., normalized). The data can also be divided into a training set and a validation set. In some aspects, a model for characterizing the normal operating characteristics (NOC) of the industrial system can be developed based on the collected historical data. In some aspects, the development of the model can take place at a central monitoring system (e.g., the central monitoring system 204). In other aspects, the development of the model can be performed at one or more outside computing devices and transferred to a memory of the central monitoring device.

The model can comprise a plurality of states for the industrial system. In some aspects, the states can be represented by values for measurements at each of one or more sensors (e.g., the one or more sensors 202). The model can further comprise one or more transitions between the plurality of states. In some aspects, each of the one or more transitions can be weighted to indicate a likelihood that the transition occurs. The model can further comprise a rubric for characterizing a magnitude of deviation from NOC based on the model. The rubric can be used to help define an anomaly (e.g., a deviation from the model).

The model can be trained using the collected training data, which can be used to extract a pattern of normal operating regions. Following training, the model can be tested using the collected validation set. In some aspects, the model can be sampled using predicted posterior distribution. By Monte Carlo (MC) sampling, the predicted posterior distribution can be approximated. Additionally, in some aspects, variational dropout can be used to eliminate one or more extraneous variables that are not necessary for the model.

By repeating stochastic forward passes through the model, samples from the approximate predictive posterior are collected, and an empirical estimator for the predictive mean at time t can be calculated as $$E(y_t^*) \approx \mu_t = \frac{1}{N}\sum_{i=1}^{N} \hat{y}_i^*(x^*)$$

Additionally, an estimated standard deviation for the empirical estimator can be calculated as $$std(y_t^*) \approx \sqrt{\tau^{-1} + \frac{1}{N}\sum_{i=1}^{N} \hat{y}_i^*(x^*)^T \hat{y}_i^*(x^*) - E(y_t^*)^T E(y_t^*)}$$

And a covariance can be estimated as $$cov(y^*) \approx \tau^{-1} I_D + \frac{1}{N}\sum_{i=1}^{N} \hat{y}_i^*(x^*)^T \hat{y}_i^*(x^*) - E(y^*)^T E(y^*)$$

where $\tau$ can be estimated as $\tau = pl^2/(2N\lambda)$ given weight-decay $\lambda$ and prior length scale l. Then, the squared Mahalanobis distance, denoted as $M^2$, can used to characterize the magnitude of a deviation. The squared Mahalanobis distance can be calculated as $$M_t^2 = (y_t - \mu_t)^T S_t^{-1} (y_t - \mu_t)$$

where $\mu_t$ is the sample mean and $S_t$ is the sample covariance of the model's predictions estimated with $$S_t = \frac{1}{N}\sum_{i=1}^{N} \hat{y}_i^*(x^*)^T \hat{y}_i^*(x^*) - \mu_t^T \mu_t$$

A threshold of $M^2$ can be determined on a validation dataset with regard to a certain level $\alpha$ of false alarms. In some aspects, the threshold can be determined from the Monte Carlo simulations to correspond to the $(1-\alpha)$-percentile of the samples. In some aspects, any data point for which the measure $M^2$ exceeds the threshold can be detected as a fault.

A BRNN with variational dropout can be used to build the model for characterizing the NOC and its intrinsic variability. BRNNs are capable of extracting nonlinear spatial and temporal signatures in the data, which can help characterize processes, including complex chemical processes. More-over, the BRNN can provide probabilistic information including a significance level of the observations (probability of occurrence) with regard to its inferred posterior distribution of the predicted outputs. This significance level can be used as a deviation measurement from the NOC region for new observations. Accordingly, observations can be detected as faults when their significance level is below a threshold determined such that a number of false alarms under NOC does not exceed a predefined level. Fault identification then involves determining which process attributes are deviating significantly In step 304, the central monitoring system can receive an initial observation ($x_t$). The initial observation can comprise a measurement from each of the one or more sensors. In some aspects, the initial observation can be received in response to a request for observation transmitted from the central monitoring system to the one or more sensors. The data can optionally be preprocessed (e.g., normalized).

At step 306, the initial observation can be input to the trained model to determine a predicted next observation ($x_{t+1}$). The predicted next observation can be based on the received observation ($x_t$) and the plurality of states of the model. In some aspects, the predicted next observation (at time t+1) can be determined based on the equations:

$$s_t = \varphi(x_t W_s + s_{t-1} U_s + b_s)$$

$$\hat{x}_{t+1} = s_t W_y + b_y$$

where $s_t$ and $x_t$ denote the state of the model and sensor measurements (i.e., input to the model) at time t, $\hat{x}_{t+1}$ is the output of the model and predicted sensor measurement at time t+1. $W_s$, $U_s$, and $b_s$ denote the weights and bias parameters of the recurrent layer of the neural network, and $W_y$ and $b_y$ denote the weights and bias parameters of the output layer of the neural network. $\varphi$ is a nonlinear function (e.g., a rectified linear unit (ReLU)) applied to each element of the vector. Although a single recurrent layer is depicted for brevity, of course there may be a number of those, potentially interspersed with other types of neural network layers. Moreover, although a "simple" recurrent node type is shown in the above equation for the model state, other nodes types can be used. Examples of alternate node types include Long-Short Term Memory (LSTM) and Gated Recurrent Unit (GRU) nodes.

In some aspects, determining the predicted next observation can comprise determining a plurality of possible predicted next observations. Each one of the plurality of possible predicted next observations can have a corresponding probability indicating a likelihood that the one of the plurality of possible predicted next observations will occur. In order to determine the plurality of possible predicted next observations, a large number of samples can be collected. In some aspects, the number of samples collected can be on the order of 100, 200, 400, or 1000. The samples can be selected via, for example, the Monte Carlo dropout method. Alternatively, any other known method for repeated random sampling can be used. Variational dropout is implemented by using the same dropout mask at each time step for inputs, outputs and also hidden states.

The central monitoring system can receive a new observation and step 308. The new observation can comprise a measurement from each of the one or more sensors. In some aspects, the new observation can be received in response to a request for observation transmitted from the central monitoring system to the one or more sensors.

At step 310, the new observation can be compared the predicted next observation. In one aspect, if the predictive distribution is Gaussian or approximately Gaussian, the squared Mahalanobis distance ($M^2$) can be used to characterize a magnitude of the deviation between the new observation and the predicted next observation. The MC samples from predictive distribution can be used to approximate the sample mean and covariance. A larger value of $M^2$ indicates a higher likelihood that the new observation is abnormal.

The detection threshold for the squared Mahalanobis distance $M_{th}^2$ can be calculated based on a predetermined acceptable false alarm rate. Any data point with a value $M^2$ exceeding the threshold can be detected as a fault.

In other aspects, if the predictive distribution is not well approximated by a Gaussian (e.g. a multimodal) distribution, non-parametric methods can be used to quantify the abnormality of each observation. For example, a local density ratio can quantify the abnormality of each new observation with respect to its predictive distribution in cases where the locality is defined by its k-nearest neighbors (k-NN).

Given the true measurement $x_t$ and MC samples from predictive distribution $\{\hat{x}_t(i)\}_{i=1,\ldots,N}$ the true measurement can be considered to be a fault if its local density is low as compared to local densities of its neighbors in the MC samples. The local density $\hat{f}(x_t)$ can be estimated as $$\hat{f}(x_t) = \frac{k}{\sum_{p \in kNN(x_t)} d(p, x_t)}$$

where k is a pre-specified number of k-NN, $kNN(x_t)$ is the set of k-NN for $x_t$ in $\{\hat{x}_t(i)\}_{i=1,\ldots,N}$ p is one sample in $kNN(x_t)$ and $d(p, x_t)$ is the Euclidean distance between $x_t$ and p. A point close to its k-NN will have high local density value.

Further, a local density ratio (LDR) for the observation $x_t$ can be calculated as $$LDR = \frac{\frac{1}{k} \sum_{p \in kNN(x_t)} \hat{f}(p)}{\hat{f}(x_t)}$$

which is ratio of the averaged local density of k-NN in $\{\hat{x}_t(i)\}_{i=1,\ldots,N}$ to the local density of $x_t$. A larger value of LDR indicates a higher likelihood that the observation $x_t$ is abnormal.

The number k of k-NN specifies the smallest number of data points in a cluster that will be considered as abnormal and influences performance of the algorithm. A small value of k can result in large fluctuations, whereas a very large value of k can reduce the detection sensitivity. Thus, a minimum k and a maximum k could be selected and, for each observation, the maximum LDR value over k can be selected as the final LDR.

The detection threshold $LDR_{th}$ can be calculated based on validation dataset given certain significance level $\alpha$, corresponding to the (1-$\alpha$) percentile of the LDR by validation MC samples. Or, $LDR_{th}$ can be calculated based on a predetermined acceptable false alarm rate. Any data point with LDR exceeding the threshold ($LDR > LDR_{th}$) will be detected as a fault.

If the new observation deviates from the predicted next observation, it is determined to be a fault (step 312). For example, for Gaussian predictive distributions, any data point with a value $M^2$ exceeding the threshold $M_{th}^2$ can be detected as a fault. Similarly, for non-Gaussian predictive distributions, any data point with LDR exceeding the detection threshold (e.g., $LDR > LDR_{th}$) can be detected as a fault.

In some aspects, the determination of a fault state can cause one or more alarms to occur. Example alarms can comprise, for example, an aural alert, a visual alert, such as a flashing light, transmission of an electronic message (e.g., an email, a text message, a pop-up window on a computer screen, etc.) to one or more system administrators, and/or other similar alerts. In some aspects, the determination of the fault state can cause alteration in operation of the industrial system.

Additionally, a BRNN-based model can perform fault identification directly, and without extra steps. One goal of fault identification is to determine which variables are strongly affected by the fault. In order to achieve this goal, each observation $x_t = [x_t^1, \ldots, x_t^{m_x}]$ can be compared to the predictive distribution $\hat{x}_t = [\hat{x}_t^1, \ldots, \hat{x}_t^{m_x}]$ obtained during fault detection procedure on an element-wise basis. Unlike fault detection, an element-wise comparison is done for each variable to its marginal distribution and the variables exceeding the confidence interval will be identified.

Although fault identification is performed based on an element-wise comparison, spatial and temporal correlations in the data can still be considered because the predictive distribution can take into consideration the spatial and temporal correlation in the data. Thus, the marginal distribution for each variable evolves over time in a certain pattern that correlates with other variables and past observations.

Similarly to the measures or statistics used for fault detection, two exemplary methodologies for fault identification are described herein, depending on the property of the predictive distribution:

When the predictive distribution follows Gaussian distribution or can be approximated by a Gaussian distribution, the standard deviation of each variable to its predictive mean can be used to measure the deviation. At time t, based on the MC samples from the posterior predictive distribution $\{\hat{x}_t(i)\}_{i=1,\ldots,N} = \{\{\hat{x}_t^l\}_{l=1,\ldots,m_x}\}_{i=1,\ldots,N}$ collected during fault detection procedure. A mean $\mu_t^l$ and a standard deviation $\sigma_t^l$ of each variable $\hat{x}_t^l$ can be approximated as $$\mu_t^l \approx \frac{1}{N} \sum_{i=1}^{N} \hat{x}_t^l(i)$$

$$\sigma_t^l \approx \sqrt{\tau^{-1} + \frac{1}{N} \sum_{i=1}^{N} \hat{x}_t^l(i)^2 - (\mu_t^l)^2}$$

When the real measurement at time t is available, the deviation $D^l$ for each variable $l \in \{1, \ldots, m_x\}$ is calculated as $$D^l = \frac{x_t^l - \mu_t^l}{\sigma_t^l}$$

Unlike $M^2$ which can only be positive, the deviation $D_l$ can be either negative or positive. Variables associated with large absolute value of $D^l$ are identified as the ones that significantly affected by the disturbance. Given a pre-defined significance level, a validation dataset for NOC can be used to determine a threshold $D_{th}^l$ and variables exceeding the threshold (e.g., $|D^l|>D_{th}^l$) are considered as abnormal.

Alternatively, when the predictive distribution is non-Gaussian, the local density ratio can be used on an element-wise basis for fault identification. Looking at each variable separately and repeating the LDR calculation procedure for each variable. Given the true measurement $x_t = \{x_t^l\}_{l=1,\ldots,m_x}$ and MC samples from the predictive distribution $\{\{\hat{x}_t^l\}_{l=1,\ldots,m_x}\}_{i=1,\ldots,N}$, the local density ratio for a variable 1 can be calculated as $$\hat{f}(x_t^l) = \frac{k}{\sum_{p^l \in kNN(x_t^l)} d(p^l, x_t^l)}$$

$$LDR^l = \frac{\frac{1}{k}\sum_{p^l \in kNN(x_t^l)} \hat{f}(p^l)}{\hat{f}(x_t^l)}$$

where $p^l$ is the one of the k-NN of $x_t^l$ for the $l^{th}$ variable and $d(p^l, x_t^l)$ is the Euclidean distance between $p^l$ and $x_t^l$.

Variables associated with a large value of $LDR^l$ are identified as significantly affected by the fault. Similar to the fault detection procedure, the validation dataset for NOC can be used to determine a threshold $LDR_{th}^l$, wherein when a value $LDR^l$ exceeds the threshold value it is given a certain significance level. Moreover, the number k of k-NN specifies the smallest number of data points in a cluster that will be considered as abnormal and influences performance of the algorithm. A small value of k can result in large fluctuation, whereas a very large value of k can reduce the detection sensitivity. Thus, a minimum k and a maximum k should be selected and, for each observation, the maximum $LDR^l$ value over k can be selected as the final $LDR^l$.

A monitoring index (e.g., either $M^2$ or LDR) can be plotted with the predetermined threshold (e.g., $M_{th}^2$ or $LDR_{th}$). In this way, users of the monitoring system can easily identify when there is abnormal behavior in the system. Moreover, the true measurements $\{x_t\}_{t=1,\ldots,T}$ can be plotted with the MC samples from the posterior predictive distribution $\{\{\hat{x}_{t+1}(i)\}_{i=1,\ldots,N}\}_{t=,\ldots,T}$ on an element-wise basis. This can provide easily interpretable visualization of the BRNN model output and the current state of the process, which can allow a direct comparison of the true observations with predictive NOC region (formed by the MC samples) on the plot. If the measurements deviate from the predictive NOC region, the users of the monitoring system should know there is a problem in the process. By looking at which variables deviate from their respect NOC region, the plot provides a quick overview of the identification result without extra steps.

The identification plot provides an easily-interpretable visualization for the identification results. By plotting identification results (the value of $\{D^l\}_{l=1,\ldots,m_x}$ or $\{LDR^l\}_{l=1,\ldots,m_x}$) at different time steps on the same map, the users of the monitoring system can easily identify an occurrence time and severity of deviation for each process variable. Moreover, variables can be ordered by the occurrence time that $\{D^l\}_{l=1,\ldots,m_x}$ or $\{LDR^l\}_{l=1,\ldots,m_x}$ significantly deviated on the identification plot, which can help to illustrate how a fault propagates in the system. Further, combined with the prior information of the process (e.g. a process flowsheet), the identification plot can be useful for root cause analysis and process recovery.

Thus, the BRNN-based model can perform fault identification directly without extra steps. That is, the model is capable of determining which variables are strongly affected by an event that causes a fault determination. For a complete online monitoring process, fault detection and identification should work in sequence, and once the fault is detected and located, expert diagnosis for root cause analysis and process recovery can be beneficial. Thus, the value of fault detection and identification is to provide operators accurate and on time information about the state of the process.

BRNNs are used to build the probabilistic model to characterize NOC, denoted as $f^{\infty}(\cdot)$. Additionally, BRNNs are capable of extracting both spatial and temporal signatures in the data which are critical for characterizing the process. Moreover, the BRNN can provide probabilistic information including the significance level of the observations, which can be used as the deviation measurement.

In order to achieve this, each observation $x_t = [x_t^1, \ldots, x_t^{m_x}]$ can be compared to the prediction $\hat{x}_t = [\hat{x}_t^1, \ldots, \hat{x}_t^{m_x}]$ on an element-wise basis. Based on the Monte Carlo samples from the posterior distribution collected during the fault detection procedure, the mean $\mu^k$ and standard deviation $\sigma^k$ of each variable $\hat{x}_t^k$ can be approximated. After determining the predictive mean and standard deviation, the deviation for each variable is calculated as, $$D^k = \frac{x^k - \mu^k}{\sigma^k}$$

Accordingly, variables with larger deviations can be flagged as abnormal. For example, when a variable has a deviation that exceeds a predefined threshold value, the variable can be flagged as abnormal. Such flagging is an indication that the flagged variable should be identified as a source of the fault.

Figures 4, 5:
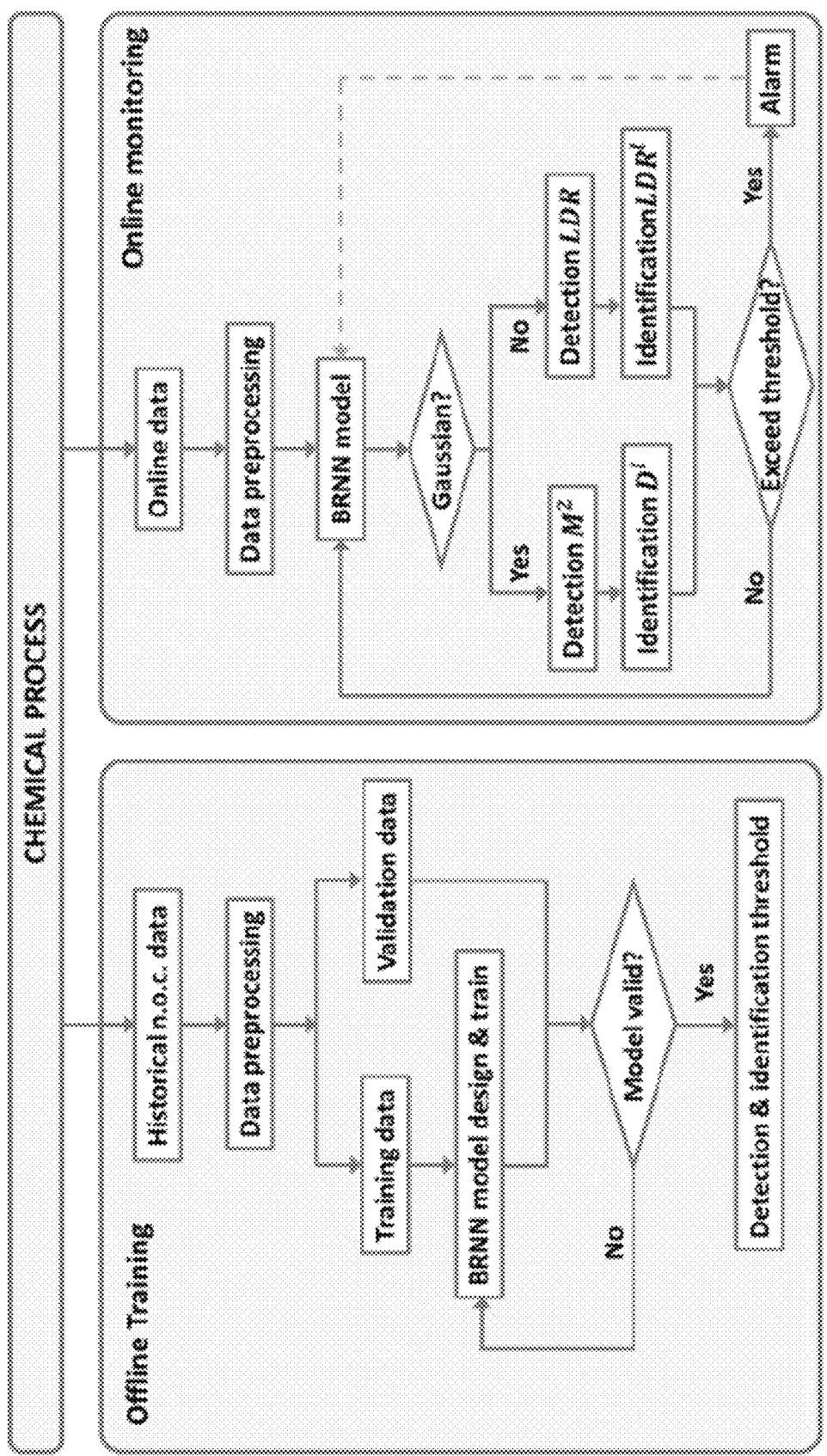
FIG. 4 is a flowchart showing a method for training of the fault detection and identification system.
FIG. 5 is a flowchart showing a method for operating the fault detection and identification system.

Accordingly, as discussed in detail above, the overall training framework is depicted in FIG. 4. Such training is typically conducted offline, but online training in place of and/or in addition to offline training is contemplated.

Step 401: Historical data is collected, normalized and divided into training/validation sets.

Step 402: A BRNN model is designed and trained using variational dropout based on the training data set.

Step 403: The Validation data set is tested on the trained BRNN model to assess fitting performance.

Step 404: If the model is validated, go to Step 405; otherwise, repeat Step 403.

Step 405: Perform normality test for predictive distribution. If not significant (e.g., the predictive distribution can be estimated to be Gaussian), go to Step 406a, otherwise go to Step 406b.

Step 406a: Determine the detection threshold $M_{th}^2$ and the identification threshold $D_{th}^l$ based on a predefined certain significance level.

Step 406b: Determine the detection threshold $LDR_{th}$ and the identification threshold $LDR_{th}^l$, based on a predefined certain significance level.

Step 407: Allow the trained BRNN model with variational dropout and the determined thresholds to be used for online monitoring.

The overall online monitoring framework is depicted in FIG. 5. The detailed fault detection and identification procedures by BRNN model are summarized as follows:

Step 501: Online data is collected and normalized according to training data.

Step 502: Online data is provided to the BRNN model, and the MC samples for next data point $\{\hat{X}_t(i)\}_{i=1,\ldots,N}$ are collected by variational dropout. If the predictive distribution is Gaussian, go to Step 503a, otherwise go to Step 503b.

Step 503a: When the next observation $x_t$ is available, calculate $M^2$ and $D^l$. If $M^2 > M_{th}^2$, go to Step 505, otherwise go to Step 504.

Step 503b: When the next observation $x_t$ is available, calculate LDR and $LDR^l$. If $LDR > LDR_{th}$, go to Step 505, otherwise go to Step 504.

Step 504: Determine that the system is normal. The true observation $x_t$ is provided into the BRNN model, and the process returns to Step 502.

Step 505: Determine that the system is abnormal and trigger the alarm. The fault identification plot can be used to identify the impacted variables. The user of the monitoring system can choose to stop the process immediately or continue to monitor the process by providing the true observation $x_t$ to the BRNN model and the process returns to Step 502

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope. Other embodiments will be apparent to those skilled in the art from consideration of the specification and practice disclosed herein. It is intended that the specification and examples be considered as exemplary only, with a true scope being indicated by the following claims.

What is claimed is:

1. A method for detecting and identifying faults in the operation of a process system, comprising:
   providing a plurality of sensors associated with the process system for monitoring the operation of the process system;
   providing a central monitoring system operably connected to the plurality of sensors;
   creating a non-linear probabilistic regression model of the process system using the central monitoring system, wherein the probabilistic regression model comprises a Bayesian recurrent neural network, wherein creating the Bayesian recurrent neural network comprises:
      collecting data regarding normal operating conditions of the process system;
      sorting the collected data into a training data set and a validation data set;
      training a Bayesian regression model using the training data set; and
      validating the trained Bayesian regression model using the validation data set;
   determining, using the central monitoring system, a detection threshold based on historical operational data of the process system obtained from the plurality of sensors;
   receiving first sensor data from the plurality of sensors associated with the process system;
   determining, using the central monitoring system, a predicted next sensor data based on the received first sensor data using the non-linear probabilistic regression model;
   receiving second sensor data from the plurality of sensors;
   calculating, using the central monitoring system, a deviation statistic between the predicted next sensor data and the received second sensor data;
   in response to the calculated deviation statistic exceeding a threshold; determining, using the central monitoring system, that a fault has occurred; and
   in response to determining that the fault has occurred, triggering one or more alarms, wherein the one or more alarms comprises one or more of an aural alert, a visual alert, or transmission of an electronic message to one or more system administrators.

2. The method of claim 1, wherein each of the received first sensor data and the received second sensor data comprises measurements from a plurality of sensors, and wherein the determined predicted next sensor data comprises a plurality of predicted measurements associated with the plurality of sensors.

3. The method of claim 2, further comprising:
   comparing, on an element-wise basis, the received second sensor data and the determined predicted next sensor data;
   determining, for each element in the received second sensor data, a measure of deviation between the received second sensor data and the predicted next sensor data;
   plotting, on a fault identification plot, the measured deviation between the received second sensor data and the predicted next sensor data for each of the elements; and
   determining, based on the fault identification plot, one or more elements that are abnormally deviated from the predicted next sensor value.

4. The method of claim 1, further comprising, in response to determining that the measured deviation does not exceed the threshold, providing the received sensor data to the Bayesian regression model for training.

5. The method of claim 1, wherein the calculated measure of deviation is the squared Mahalanobis distance.

6. The method of claim 1, wherein the calculated measure of deviation is a local density ratio based on a set of k nearest neighbors (k-NN).

7. The method of claim 1, further comprising adjusting the threshold based on the received second sensor data or prior detection rates.

8. An apparatus for detecting and identifying faults in the operation of a process system, comprising:
   a plurality of sensors associated with the process system for monitoring the operation of the process system; and
   a central monitoring system having one or more processors in communication with the plurality of sensors, and
   a memory having embodied thereon processor executable instructions that, when executed by the one or more processors, cause the apparatus to:
      collect, using the plurality of sensors, data regarding normal operating conditions of a process;

sort, using the central monitoring system, the collected data to create a training data set and a validation data set;

train, using the central monitoring system, a Bayesian regression model using the training data set;

receive first sensor data from a plurality of sensors associated with the system;

determine, using the central monitoring system, a predicted next sensor data based on the received first sensor data and the non-linear network model;

receive second sensor data from the plurality of sensors, wherein each of the received first sensor data and the received second sensor data comprises measurements from a plurality of sensors, and wherein the determined predicted next sensor data comprises a plurality of predicted measurements associated with the plurality of sensors;

calculate, using the central monitoring system, a measure of deviation between the predicted next sensor data and the received second sensor data; and in response to the measured deviation exceeding a threshold; determine, using the central monitoring system, that a fault has occurred.

9. The apparatus of claim 8, wherein the Bayesian regression model comprises a Bayesian recurrent neural network.

10. The apparatus of claim 9, wherein the memory further has embodied thereon embodied thereon processor executable instructions that, when executed by the one or more processors, cause the apparatus to:

compare, on an element-wise basis, the received second sensor data and the determined predicted next sensor data;

determine, for each element in the received second sensor data, a measure of deviation between the received second sensor data and the predicted next sensor data;

plot, on a fault identification plot, the measured deviation between the received second sensor data and the predicted next sensor data for each of the elements; and determine, based on the fault identification plot, one or more elements that are abnormally deviated from the predicted next sensor value.

11. The apparatus of claim 8, wherein the memory further has embodied thereon embodied thereon processor executable instructions that, when executed by the one or more processors, cause the apparatus to, in response to determining that the measured deviation does not exceed a predetermined threshold, provide the received sensor data to the Bayesian regression model for training.

12. The apparatus of claim 8, wherein the calculated measure of deviation is a squared Mahalanobis distance.

13. The apparatus of claim 8, wherein the calculated measure of deviation is a local density ratio based on a set of k nearest neighbors (k-NN).

14. The apparatus of claim 8, wherein the memory further has embodied thereon embodied thereon processor executable instructions that, when executed by the one or more processors, cause the apparatus to adjust the threshold based on the received second sensor data.

15. The apparatus of claim 8, wherein the memory further has embodied thereon embodied thereon processor executable instructions that, when executed by the one or more processors, cause the apparatus to, in response to determining that the fault has occurred, triggering one or more alarms.

16. The apparatus of claim 15, wherein the one or more alarms comprises one or more of an aural alert, a visual alert, or transmission of an electronic message to one or more system administrators.

* * * * *